United States Patent
Moore et al.

(10) Patent No.: US 7,870,425 B2
(45) Date of Patent: Jan. 11, 2011

(54) DE-CENTRALIZED NODAL FAILOVER HANDLING

(75) Inventors: David P. Moore, Mudgeeraba (AU); Zoran Radenkovic, Robina (AU); John T. Robertson, Queensland (AU)

(73) Assignee: International Business Machines Corporation, Armonk, NY (US)

( * ) Notice: Subject to any disclaimer, the term of this patent is extended or adjusted under 35 U.S.C. 154(b) by 382 days.

(21) Appl. No.: 11/944,574

(22) Filed: Nov. 23, 2007

(65) Prior Publication Data

US 2009/0138751 A1 May 28, 2009

(51) Int. Cl.
*G06F 11/00* (2006.01)
(52) U.S. Cl. ............... 714/13; 714/4; 714/10; 714/43; 714/55
(58) Field of Classification Search .............. 714/2, 714/4, 10, 11, 13, 43, 48, 55
See application file for complete search history.

(56) References Cited

U.S. PATENT DOCUMENTS

| 2003/0069962 | A1* | 4/2003 | Pandya .................. 709/224 |
| 2006/0080568 | A1* | 4/2006 | Subbaraman et al. ......... 714/4 |
| 2006/0107108 | A1* | 5/2006 | Geng et al. ................... 714/11 |
| 2006/0136929 | A1* | 6/2006 | Miller et al. ................. 718/105 |
| 2007/0006015 | A1* | 1/2007 | Rao et al. ....................... 714/4 |
| 2007/0174661 | A1* | 7/2007 | Peddada ........................ 714/4 |
| 2007/0245167 | A1* | 10/2007 | De La Cruz et al. ............ 714/4 |
| 2009/0037573 | A1* | 2/2009 | Qiu et al. ...................... 714/4 |

* cited by examiner

*Primary Examiner*—Robert Beausoliel
*Assistant Examiner*—Joseph D Manoskey
(74) *Attorney, Agent, or Firm*—Jeff La Baw, Esq.; Steven M. Greenberg, Esq.; Carey Rodriguez Greenberg & Paul LLP

(57) ABSTRACT

Embodiments of the present invention provide a method, system and computer program product for de-centralized nodal failover handling in a high availability computing architecture. The system can include multiple different nodes coupled to one another in a cluster over a computer communications network including an initial lead node and remaining auxiliary nodes. The system further can include a messaging service coupled to each of the nodes and nodal failover handling logic coupled to each of the nodes and to the messaging service. The logic can include program code enabled to periodically receive heartbeat messages from the messaging service for the initial lead node and to subsequently detect a lapse in the heartbeat messages, to post within a message to the messaging service a request to become a replacement lead node in response to detecting the lapse in the heartbeat messages, and to periodically post heartbeat messages to the messaging service as the replacement lead node for the initial lead node.

8 Claims, 2 Drawing Sheets

DE-CENTRALIZED NODAL FAILOVER HANDLING

BACKGROUND OF THE INVENTION

1. Field of the Invention

The present invention relates to the field of high availability and more particularly to nodal failover handling in a high availability network architecture.

2. Description of the Related Art

High availability also relates to the allocation of computing resources to ensure reliability in a computing architecture. In this regard, high availability systems support mission critical application logic—even at the expense of high performance—in order to ensure the availability of a computing system during a given measured period. To achieve high availability, redundant computing resources are assigned to replace allocated computing resources in a failover mode so as to ensure availability of application logic irrespective of any failure conditions which may arise.

Clustered computing systems embody a type of network architecture supporting high availability. In clustered environments, a cluster of nodes support a single computing mission whereas a lead node normally handles the computing mission while the remaining auxiliary nodes remain in waiting for a failover condition arising in the lead node. During failover, an auxiliary node can be assigned responsibility to continue handling the computing mission so as to relieve the failed lead node. In this regard, the auxiliary node becomes the lead node. To the extent that multiple auxiliary nodes support the lead node in a failover condition, a policy can determine which of the auxiliary nodes should become the lead node during a failover condition.

Managing a high availability computing architecture can be a daunting task—particularly when directing a transition of lead node responsibility from one node to another in a failover condition. At present, centralized management and control is preferred both for detecting a failover condition in a lead node and also in assigning the lead node responsibility to an auxiliary node. For instance, in U.S. Pat. No. 7,139,930 to Mashayekhi et al. for FAILOVER SYSTEM AND METHOD FOR CLUSTER ENVIRONMENT, the determination and management of a failover condition is performed centrally for all nodes in a cluster. Likewise, in U.S. Pat. No. 6,961,768 to Davis et al. for STATUS POLLING FAILOVER OF DEVICES IN A DISTRIBUTED NETWORK MANAGEMENT HIERARCHY, a central controller detects and manages a failover condition in a high availability network architecture.

Centralized management of a failover condition in a high availability architecture can be effective in a tightly controlled environment of limited geographic scope. In the modern distributed computing environment, however, centralized management of a failover condition is not feasible due to the random addition and removal of nodes in a distributed cluster, and the presence of security enforcement points inhibiting the penetration of a centralized controller into a particular node. Peer-to-peer techniques for detecting and managing failover conditions further fail in a distributed cluster for the same reasons.

BRIEF SUMMARY OF THE INVENTION

Embodiments of the present invention address deficiencies of the art in respect to failover management in a high availability computing architecture and provide a novel and non-obvious method, system and computer program product for de-centralized nodal failover handling in a high availability computing architecture. In an embodiment of the invention, a method for de-centralized nodal failover handling in a high availability computing architecture can be provided. The method can include subscribing to a messaging service as an auxiliary node to an initial lead node, periodically receiving heartbeat messages from the messaging service for the initial lead node and subsequently detecting a lapse in the heartbeat messages.

Upon detecting a lapse in heartbeat messages, the method can include posting within a message to the messaging service a request to become a replacement lead node, and periodically posting heartbeat messages to the messaging service as the replacement lead node for the initial lead node. The method further can include receiving a message from the messaging service from a different auxiliary node requesting to become a replacement lead node for the initial lead node, and deferring to the different auxiliary node in becoming the replacement lead node for the initial lead node while remaining an auxiliary node to the replacement lead node in response to receiving the message from the messaging service.

In another embodiment of the invention, a high availability data processing system can be provided. The system can include multiple different nodes coupled to one another in a cluster over a computer communications network. The nodes can include an initial lead node and remaining auxiliary nodes. The system further can include a messaging service coupled to each of the nodes. Finally, the system can include nodal failover handling logic coupled to each of the nodes and to the messaging service. The logic can include program code enabled to periodically receive heartbeat messages from the messaging service for the initial lead node and to subsequently detect a lapse in the heartbeat messages, to post within a message to the messaging service a request to become a replacement lead node in response to detecting the lapse in the heartbeat messages, and to periodically post heartbeat messages to the messaging service as the replacement lead node for the initial lead node.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for de-centralized nodal failover handling in a high availability computing architecture. In accordance with an embodiment of the present invention, a messaging service can be provided for the communication of messages with different nodes in a computing cluster arranged for high availability. A lead node amongst the nodes in the computing cluster can post heartbeat messages to the message service and auxiliary nodes amongst the nodes in the computing cluster can subscribe to the heartbeat messages. Within each of the auxiliary nodes, upon detecting a lapse in heartbeat messages by the lead node, the auxiliary nodes each can post a message to the messaging service to assume lead node status. A first one of the auxiliary nodes to post the message to assume lead node status becomes the lead node amongst the remaining nodes. In this way, neither a centralized controller nor peer-to-peer nodal communication is required to manage the failover condition.

Figure 1:
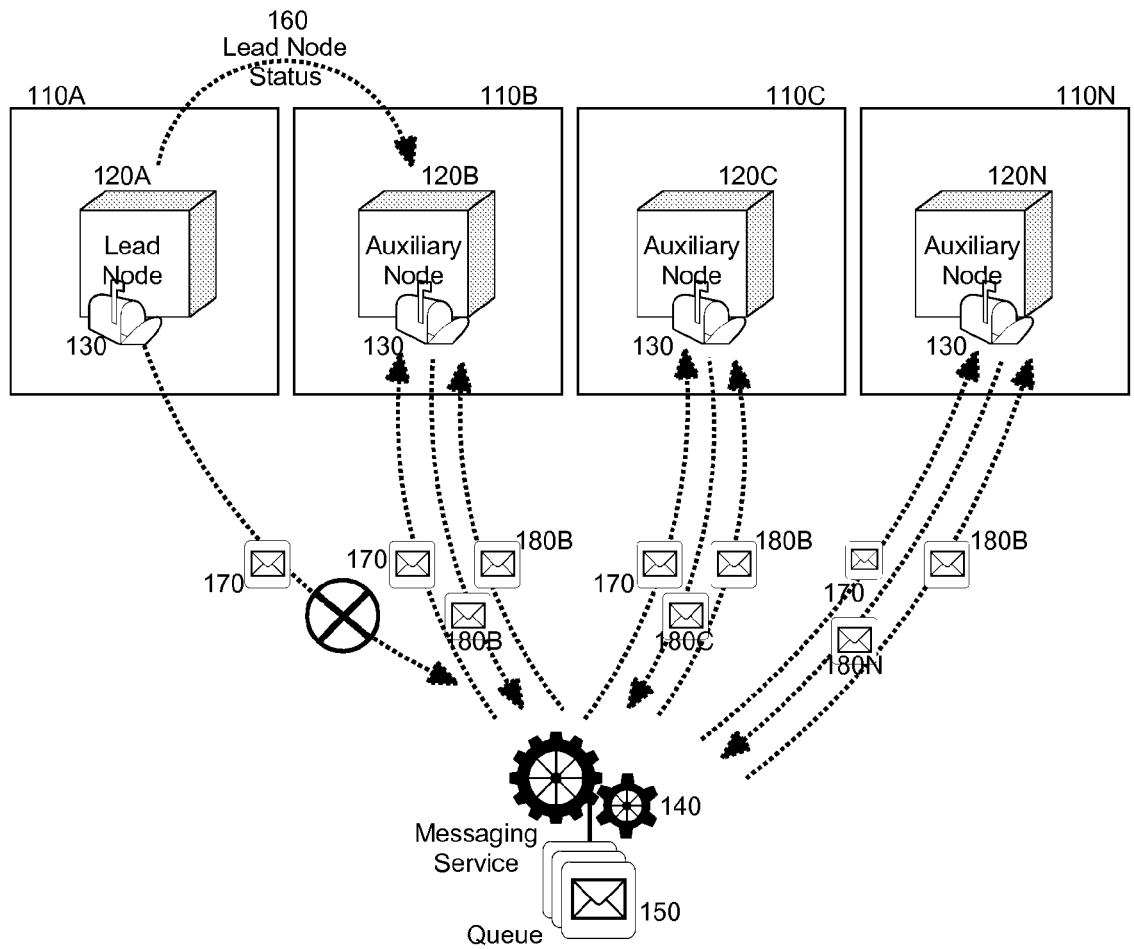
FIG. 1 is a pictorial illustration of a high availability computing architecture configured for de-centralized nodal failover handling.

In further illustration, FIG. 1 is a pictorial illustration of a high availability computing architecture configured for de-centralized nodal failover handling. As shown in FIG. 1, a clustered computing environment can be established amongst different nodes 120A, 120B, 120C, 120N distributed across different computing networks 110A, 110B, 110C, 110N. In particular, the different computing networks 110A, 110B, 110C, 110N can include different sub-nets or entirely different domains each with its own set of security enforcement points. One of the nodes 120A, 120B, 120C, 120N can be designated the lead node 120A, whilst the remaining ones of the nodes 120A, 120B, 120C, 120N can be designated auxiliary nodes 120B, 120C, 120N.

Each of the nodes 120A, 120B, 120C, 120N can include a messaging interface 130 to a messaging service 140, for example a Java(TM) Messaging Service (JMS) server. (Java is a trademark of Sun Microsystems, Inc. of Menlo Park, Calif.). To that end, each of the nodes 120A, 120B, 120C, 120N through a respective messaging interface 130 can subscribe to and receive messages from the messaging service 140 and also can publish messages to the messaging service 140 for receipt by others of the nodes 120A, 120B, 120C, 120N. As such, the messaging service 140 can include a queue 150 into which inbound published messages are stored and queued prior to distribution to subscribing ones of the nodes 120A, 120B, 120C, 120N. For example, the queue 150 can process messages on a first-in first out basis.

In operation, the lead node 120A having lead node status 160 in the eyes of the other auxiliary nodes 120B, 120C, 120N periodically can publish a heartbeat message 170 to the messaging service 140. The auxiliary nodes 120B, 120C, 120N as subscribers to the messaging service 140 can receive the heartbeat message 170 thereafter. In the event, however, that any of the auxiliary nodes 120B, 120C, 120N fails to receive a heartbeat message 170 from the messaging service 140 on behalf of the lead node 120A within a determined period of time, the auxiliary nodes 120B, 120C, 120N individually can publish a request message 180B, 180C, 180N to acquire lead node status 160.

In this regard, the lead node 120A may either exit the system unexpectedly, or the lead node may simply take too long to publish a heartbeat message 170. Regardless, the failure to receive the heartbeat message 170 by the auxiliary nodes 120B, 120C, 120N will result in the auxiliary nodes 120B, 120C, 120N attempting to acquire lead node status 160. In this regard, once the auxiliary nodes 120B, 120C, 120N individually have published a request message 180B, 180C, 180N to acquire lead node status 160, the first of the request messages 180B to be received in the queue 150 for publication to the nodes 120A, 120B, 120C, 120N will be received by the nodes 120A, 120B, 120C, 120N causing the remaining auxiliary nodes 120C, 120N to acquiesce to the auxiliary node 120B acquiring lead node status 160. In this way, control of the nodal failover process can occur without centralized management or peer-to-peer interactivity.

Figure 2:
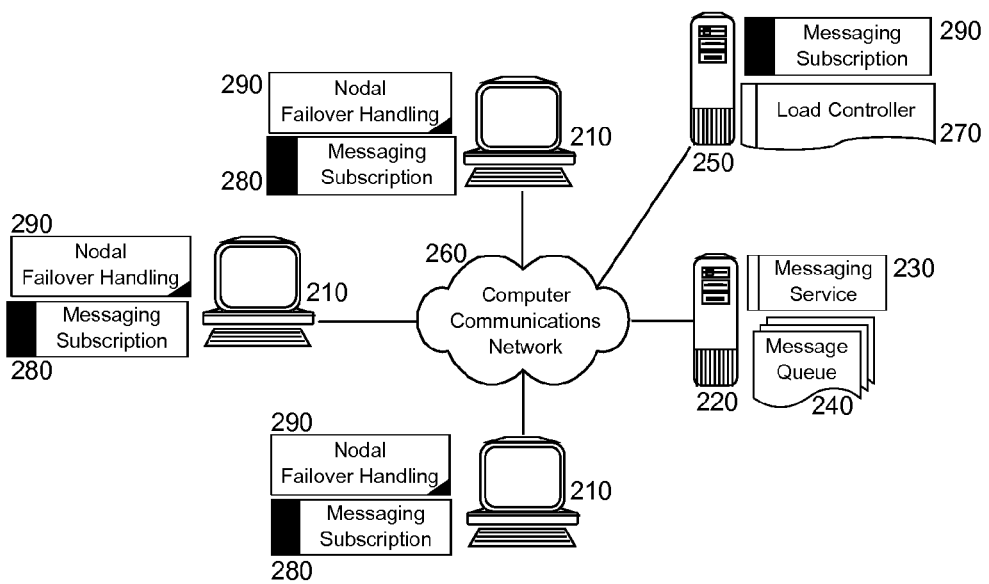
FIG. 2 is a schematic illustration of a high availability computing architecture configured for de-centralized nodal failover handling; and, FIG. 3 is a flow chart illustrating a process for de-centralized nodal failover handling in a high availability computing architecture.

In one embodiment of the invention, the process described according to FIG. 1 can be implemented in a high availability computing architecture. In illustration, FIG. 2 schematically depicts a high availability computing architecture configured for de-centralized nodal failover handling. As shown in FIG. 2, multiple different nodes 210 can be coupled to a host server 250 over computer communications network 260. The host server 250 can include a lead node proxy 270 configured to direct the handling of computing workloads to a lead one of the nodes 210. Each of the nodes 210 and the host server 250 further can be coupled to a messaging host 220 over the computer communications network 260. The messaging host 220 can support the operation of a messaging service 230 managing a message queue 240 of messages for delivery to subscribers.

Each of the nodes 210 and the host server 250 can include a messaging subscription interface 280. The messaging subscription interface 280 can provide for the subscription and publication to messages in the message queue 240 on behalf of the coupled nodes and the host server 250. In this way, whenever a message is placed in the message queue 240, the message will be provided to each of the nodes 210 and the host server 250 having subscribed to the messaging service 230 for such messages. Notably, each of the nodes 210 further can include nodal failover handling logic 290. The nodal failover handling logic 290 can include program code enabled to behave either in a lead node mode or an auxiliary node mode.

In the lead node mode, the program code can provide for the transmission of a heartbeat message to the messaging service 230 on a periodic basis. In the auxiliary node mode, however, the program code can provide for the detection of a lapse of time during which no heartbeat message is received from the messaging service 230. In the latter circumstance, the program code can be enabled to publish a request to become the lead node. In turn, upon receiving a message with a request to become a lead node published by another auxiliary node, the program code can be enabled to revert to the detection of a heartbeat message by the newly appointed lead node as before. In contrast, if the request to become the lead node is not from another auxiliary node, the program code can be enabled to switch to lead node mode.

Figure 3:
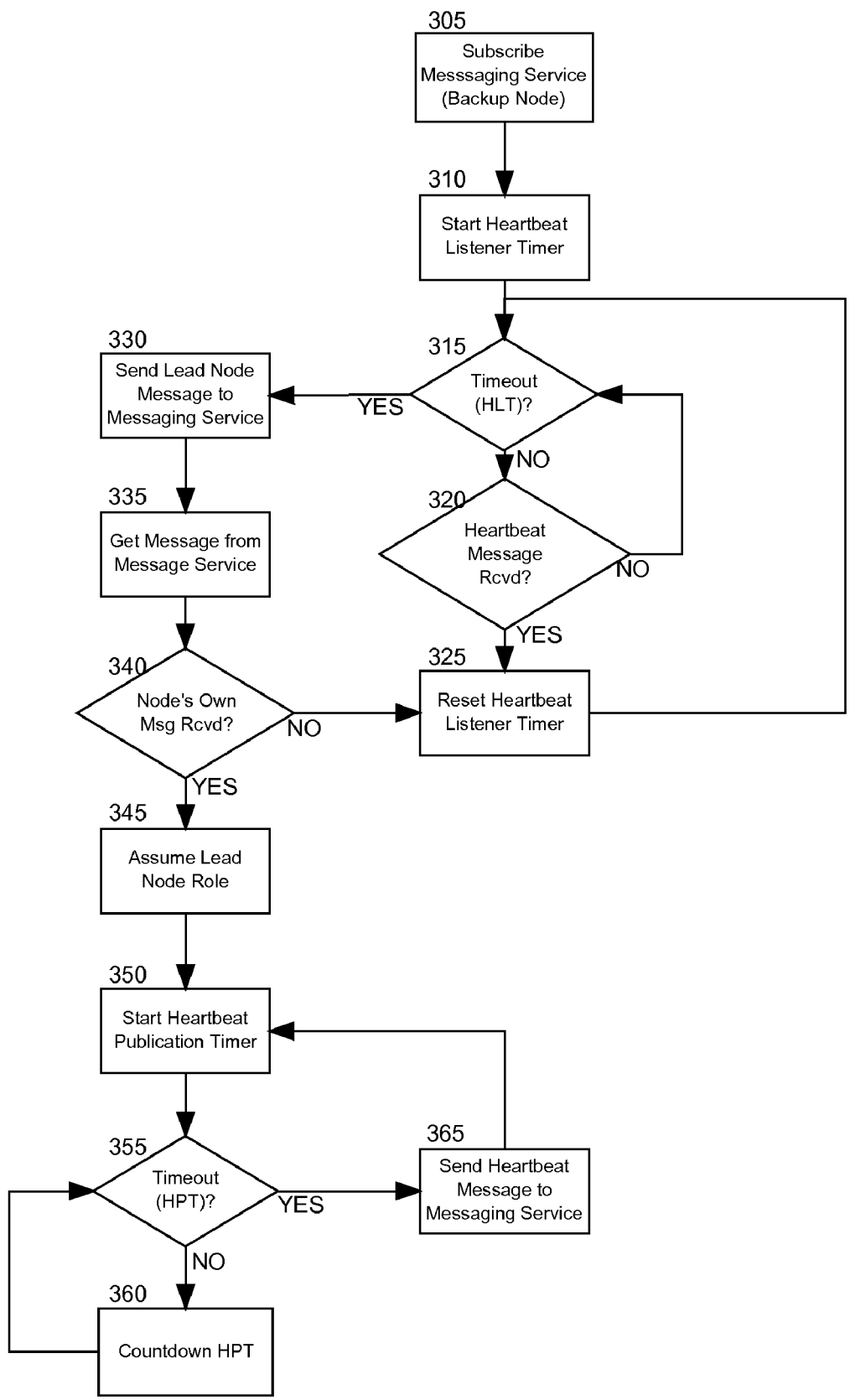

In yet further illustration of the operation of the nodal failover handling logic, FIG. 3 is a flow chart illustrating a process for de-centralized nodal failover handling in a high availability computing architecture. Beginning in block 305, as a node comes on line, the node can subscribe to the messaging service as a backup or auxiliary node. In block 310, a heartbeat listener timer can be initiated during which period of time the node expects to receive a heartbeat message through the messaging service from the lead node.

In block 315, it can be determined whether the heartbeat listener timer has timed out. If not, in decision block 320 it further can be determined whether or not a heartbeat message has been received. If so, the heartbeat listener timer can be reset in block 325 and the process can return to decision block 315. In decision block 315, if a time out condition arises, in block 330 a lead node message can be published to the messaging service with a request to become the lead node. Thereafter, the lead node message can be published to all nodes and, as such, in block 335 a message can be received indicating a request for lead node status (though it is to be recognized that the lead node message may have originated in a different auxiliary node.

In decision block 340, it can be determined whether the lead node message received is the same as the message sent in block 330. If not, the lead node message will have originated from another auxiliary node having transmitted the lead node message sooner than that of block 330 resulting in the lead node message being placed higher in the message queue. Consequently, the requested lead node role can defer to the other auxiliary node such that in block 325 a heartbeat listener timer can reset and the process can continue through decision block 315. Yet, if it is determined in decision block 340 that the received lead node message is the same as that transmitted in block 330, in block 345 a lead node role can be assumed and in block 350 a heartbeat publication timer can be initiated.

In decision block 355, if the heartbeat publication timer has expired, in block 365 a heartbeat message can be published to the messaging service for the benefit of the auxiliary nodes. Otherwise, the heartbeat publication timer can countdown and the process can repeat through block 355. Of course, in the event of a failover condition, a heartbeat message will not be sent and an auxiliary node detecting a timeout condition for the heartbeat message will send a lead node message to assume the lead node role. Notwithstanding, the process illustrated in FIG. 3 for nodal failover handling is managed without the intervention of a centralized controller and without the necessity for direct node-to-node communications across secure domains and sub-domains not necessarily permitting direct node-to-node communications.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A method for de-centralized nodal failover handling in a high availability computing architecture, the method comprising:

subscribing by a node executing in memory by a processor of a computer to a messaging service as an auxiliary node to an initial lead node;

periodically receiving in the auxiliary node heartbeat messages from the messaging service for the initial lead node and subsequently detecting a lapse in the heartbeat messages;

posting by the auxiliary node within a message to the messaging service a request to become a replacement lead node in response to detecting the lapse in the heartbeat messages; and, periodically posting heartbeat messages to the messaging service as the replacement lead node for the initial lead node.

2. The method of claim 1, further comprising:

receiving a message from the messaging service from a different auxiliary node requesting to become a replacement lead node for the initial lead node; and, deferring to the different auxiliary node in becoming the replacement lead node for the initial lead node while remaining an auxiliary node to the replacement lead node in response to receiving the message from the messaging service.

3. A high availability data processing system comprising:

a plurality of nodes coupled to one another in a cluster over a computer communications network, the nodes comprising an initial lead node and remaining auxiliary nodes, each node comprising at least one processor and memory disposed within a computing cluster;

a messaging service executing in memory by at least one processor of a host server coupled to each of the nodes; and, nodal failover handling logic coupled to each of the nodes and to the messaging service, the logic comprising program code enabled to periodically receive heartbeat messages from the messaging service for the initial lead node and to subsequently detect a lapse in the heartbeat messages, to post within a message to the messaging service a request to become a replacement lead node in response to detecting the lapse in the heartbeat messages, and to periodically post heartbeat messages to the messaging service as the replacement lead node for the initial lead node.

4. The system of claim 3, wherein the message service comprises a message queue configured to queue messages for publication to the nodes on a first-in first-out basis.

5. The system of claim 3, wherein the messaging service is a JAVA(TM) messaging service (JMS) compliant messaging service.

6. The system of claim 3, wherein each of the nodes is disposed in a separate domain.

7. A computer program product comprising a computer readable storage medium embodying computer usable program code for de-centralized nodal failover handling in a high availability computing architecture, the computer program product comprising:

computer usable program code for subscribing to a messaging service as an auxiliary node to an initial lead node;

computer usable program code for periodically receiving heartbeat messages from the messaging service for the initial lead node and subsequently detecting a lapse in the heartbeat messages;

computer usable program code for posting within a message to the messaging service a request to become a replacement lead node in response to detecting the lapse in the heartbeat messages; and, computer usable program code for periodically posting heartbeat messages to the messaging service as the replacement lead node for the initial lead node.

8. The computer program product of claim 7, further comprising:

computer usable program code for receiving a message from the messaging service from a different auxiliary node requesting to become a replacement lead node for the initial lead node; and, computer usable program code for deferring to the different auxiliary node in becoming the replacement lead node for the initial lead node while remaining an auxiliary node to the replacement lead node in response to receiving the message from the messaging service.

\* \* \* \* \*